(12) United States Patent
Schwitters et al.

(10) Patent No.: US 6,526,413 B2
(45) Date of Patent: *Feb. 25, 2003

(54) ARCHITECTURE FOR A HIERARCHICAL FOLDER STRUCTURE IN HAND-HELD COMPUTERS

(75) Inventors: Chad A. Schwitters, Redmond, WA (US); Roman Sherman, Bellevue, WA (US)

(73) Assignee: Microsoft Corporation, Redmond, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/407,648

(22) Filed: Sep. 28, 1999

(65) Prior Publication Data

US 2002/0099719 A1 Jul. 25, 2002

(51) Int. Cl.[7] ............................................... G06F 17/30
(52) U.S. Cl. ....................................... 707/104; 707/100
(58) Field of Search .......................... 707/104, 10, 100, 707/102, 200, 203; 709/310, 206, 204

(56) References Cited

U.S. PATENT DOCUMENTS

| | | | | |
|---|---|---|---|---|
| 5,684,984 A | * | 11/1997 | Jones et al. | 707/10 |
| 5,758,354 A | * | 5/1998 | Huang et al. | 707/201 |
| 5,812,773 A | * | 9/1998 | Norin | 709/204 |
| 5,961,590 A | * | 10/1999 | Mendez et al. | 709/206 |
| 6,131,096 A | * | 10/2000 | Ng et al. | 707/10 |
| 6,167,402 A | * | 12/2000 | Yeager | 707/10 |
| 6,324,587 B1 | * | 11/2001 | Trenbeath et al. | 709/310 |

* cited by examiner

Primary Examiner—Sanjiv Shah
(74) Attorney, Agent, or Firm—Merchant & Gould P.C.

(57) ABSTRACT

A method of operating a hand-held computer including a database and a data port for communications with a server, the database including a plurality of records that correspond to a folder data structure. The method comprises searching the database for an available folder ID; creating a folder, the folder having a data structure being stored as a record in the database and including folder ID field, a parent folder ID field, and a folder name field, the available folder ID being stored in the folder ID field; and repeating searching and creating thereby creating a plurality of folders, wherein the value stored in the folder ID field for one folder equals the value stored in the parent folder ID field for another folder, thereby creating a parent/child relationship between the folders.

41 Claims, 13 Drawing Sheets

| Hierarchical Folder Structures | Folder ID |
|---|---|
| 536 Default Hierarchy { 500 Default Hierarchy | 0 |
| 502 Inbox | 1 |
| 504 Outbox | 2 |
| 506 Sent | 3 |
| 508 Embedded Messages | 4 |
| 510 Other | 5 |
| 538 Non-default Hierarchy { 512 Service 1 | 256 |
| 514 Inbox | 257 |
| 516 Outbox | 258 |
| 518 Sent | 259 |
| 520 User Defined 2 | 264 |
| 522 Sub-User Defined 1 | 266 |
| 524 Sub-User Defined 2 | 267 |
| 540 Non-Default Hierarchy { 526 Service 2 | 260 |
| 528 Inbox | 261 |
| 530 Outbox | 262 |
| 532 Sent | 263 |
| 534 User Defined 1 | 265 |

Fig. 5

ARCHITECTURE FOR A HIERARCHICAL FOLDER STRUCTURE IN HAND-HELD COMPUTERS

REFERENCE TO CO-PENDING APPLICATIONS

This patent application is being filed concurrently with a co-assigned application entitled Application Programming Interface Functions for Supporting an Improved Message Store for Hand-Held Computers, which is identified by U.S. application Ser. No. 09/407,545, the disclosure of which is hereby incorporated by reference.

TECHNICAL FIELD

The present invention relates to an architecture for a hierarchical folder structure in hand-held computers such as a Handheld PC or a Palm-size PC. More particularly, one aspect of the present invention relates to a message store system that has a hierarchical folder structure. Another aspect of the present invention relates to a message store system having a hierarchical folder structure that is backward compatible with previous more primitive versions of the hand-held computer's message store.

BACKGROUND

As computers continue to develop, people are becoming more reliant on them for both conducting business and managing their everyday affairs. This ever-increasing acceptance is particularly true for hand-held computers, which are commonly used as to execute personal information manager software (PIM). PIM functions typically include e-mail, task list, calendar, and contact information. The data in most hand-held devices can be synchronized with PIM data that is stored on a server computer or a desktop personal computer.

A particularly useful feature of hand-held computers is to include e-mail client software for receiving and managing electronic messages, or e-mail. Furthermore, more and more users have multiple e-mail accounts with different services. For example, a user might have an e-mail account with his or her employer, a personal e-mail account with a commercial service, and an e-mail account for a home-based business.

Electronic messages, or e-mails, are typically stored in a message store. A message store system usually permits a user to organize his or her messages into folders such as those named Inbox, Outbox, and Deleted Items. Additionally, most message stores allow users to define their own folders, so that users can organize and manage their messages in a way that suits their individual needs.

One problem with the current architecture for message stores on Handheld and Palm-size PCs is that they provide only 8-bits from a set of flags to identify mail folders, which limits the number of folders on the Handheld and Palm-size PCs to 256. However, most e-mail severs do not have a similar limitation, allowing a user to have more than 256 folders. If the user creates more than 256 folders in such a server mail store, not all of the user's folders will be synchronized between the server's and the hand-held's message store.

Another problem is that current message stores on hand-held computers contain only a flat folder structure. In other words, the message store does not allow a parent/child relationship between folders. Nor does the message store allow different sets of folders. Accordingly, current message stores typically place all electronic messages or e-mail that it receives in the same flat folder structure or set of folders. Currently messages coming from different services are placed in the same set of folders.

Yet another problem arises because even if a hand-held computer was designed with a message store that addressed these problems, many of the programs used on the hand-held computer are written to interface with a flat-folder structure as well as other features of the previously existing mail store. This limitation would prevent many users from upgrading the message store system on their hand-held computers. If they did upgrade their hand-held message store, they would be required to also upgrade the other programs on their hand-held computer that interface with the message store.

SUMMARY

In general terms, the present invention addresses these problems by providing a hierarchical folder structure for the mail store architecture. Such a structure permits the creation of a folder hierarchy for each message service with which the user has an account. As a result, the hand-held message store can organize messages received from different services. Another aspect of the present invention also provides backward compatibility so that a hand-held computer embodying the present invention can be used by applications written to communicate with the earlier versions of the message store.

One aspect of the present invention relates to a computer-readable medium in a hand-held computer apparatus. The computer readable medium contains a message store configured to include a hierarchical structure of mail folders. The hierarchical structure of mail folders includes a plurality of folders. The computer-readable medium has stored thereon a data structure where a first folder data structure contains data representing a first folder ID. The first folder ID corresponds to a first folder. A second folder data structure contains data representing a second folder ID. The second folder ID corresponds to a second folder. The first folder ID is a parent of the second folder ID within the hierarchical structure of mail folders.

Another aspect of the present invention includes a hand-held computer apparatus having a folder module that creates a hierarchical structure of folders, including at least first and second folders. The first folder is a parent of the second folder. Each folder has a folder data structure, and each folder data structure includes a folder ID field and a folder name field. A message module creates a database of messages. Each message has a message data structure, and each message data structure has a folder ID field corresponding to data that identifies a folder in the hierarchical structure.

Yet another aspect of the present invention is a method of operating a hand-held computer. The hand-held computer communicates with a server, and the server contains an object store. The method creates a hierarchical structure of folders, including at least first and second folders, the first folder being a parent of the second folder, each folder having a folder data structure, each folder data structure including a field corresponding to a folder ID and a folder name. Additionally, a database of folders is created; and a database of messages is created, each message has a message data structure, having a field corresponding to a folder ID that identifies a folder in the hierarchical folder structure.

DESCRIPTION OF THE DRAWINGS

FIG. 5 illustrates a set of multiple hierarchies within a user-specified, hierarchical folder architecture for a message store system according to an example embodiment of the present invention.

DETAILED DESCRIPTION

The following discussion is intended to provide a brief, general description of a suitable computing environment in which the invention may be implemented. Although not required, the invention will be described in the general context of computer-executable instructions being executed by a hand-held computer. The structure, creation, and use of a message store hierarchical folder structure are described after the discussion of an exemplary operating environment.

Additionally, the logical operations of the various embodiments of the invention described herein are implemented as: (1) a sequence of computer implemented steps running on a computing system; and/or (2) interconnected machine modules within the computing system. Modules represent functions executed by program code such as the code found in a dynamic-link library (DLL). The implementation used is a matter of choice dependent on the performance requirements of the hand-held computer and/or the server. Accordingly, the logical operations making up the embodiments of the invention described herein are referred to alternatively as operations, steps, or modules.

Figure 1:
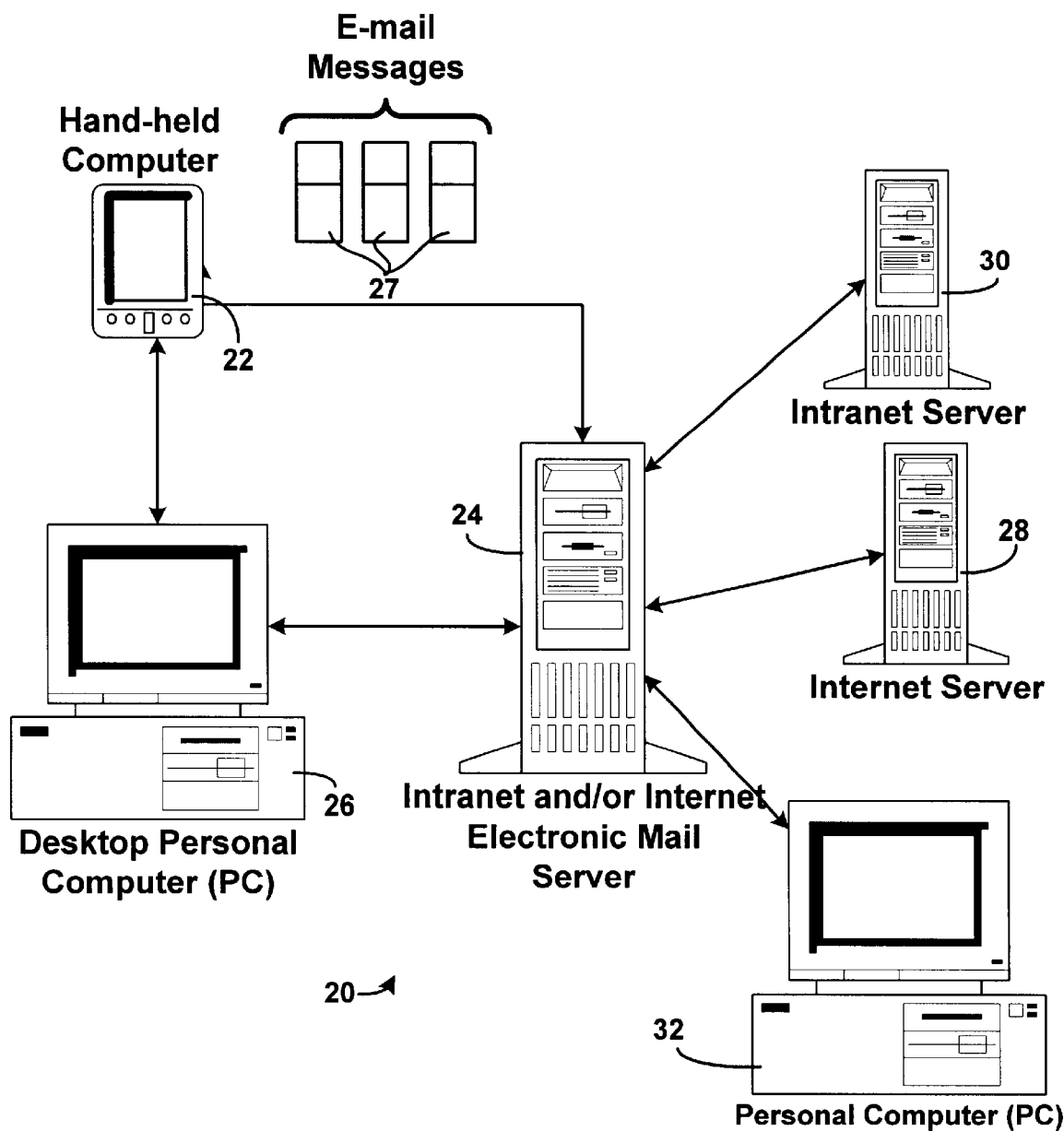
FIG. 1 illustrates a logical block diagram of a multi-computer processing system used to exchange electronic messages according to one embodiment of the present invention.

A client/server network system 20 comprising a client computer system 22 which is connected to a server computer system 24 is shown in FIG. 1. The client computer system 22 is a portable hand-held computer that includes an operating system capable of carrying out the steps of the present invention. The hand-held computer 22 is also connectable to a desktop personal computer (PC) 26 as a companion device, wherein the desktop PC connects to the server 24. The term "hand-held computer" as used herein broadly means any small computer platform in which the operating system is not required to boot when the power is turned on so that various programs can be instantly used by a user. Examples of hand-held computers include those that are commercially available as Handheld PC's (i.e., H/PC and H/PC Pro), Palm-sizePCs, AutoPC's (i.e., personal computers mounted onboard of a motorized vehicle), and other computers having similar platforms. Other examples include kitchen appliances, telephones, watches, television set-top boxes, consumer electronics, and any other device that include computers having similar platforms.

The server 24 is either an Internet server or an Intranet server that sends and receives electronic items, such as electronic mail messages (e-mail) 27, through various connections or gateways to other computer systems, such as an Internet e-mail server 28, an Intranet server 30, and/or another desktop PC 32. In another embodiment, the server 24 is an exchange server. The server 24 receives e-mail messages from the other computing systems 28, 30, and 32 and stores these e-mail messages for the user of the hand-held computer 22 and the PC 26 in an account dedicated to that user.

The e-mail server communicates with the various computers 22, 26, 28, 30 and 32 using specific protocols, i.e., rules governing the type and form of communications. The e-mail server may communicate with the hand-held computer 22 using a variety of protocols such as the Post Office Protocol (POP), the Internet Message Access Protocol (IMAP), or some other protocol. POP is rudimentary and offers few operational features to the user. IMAP offers more features in communication between a client device, such as the hand-held computer 22, and the network server device such as the server 24.

The hand-held computer 22 has a messaging system that receives and stores server-based items, such as the e-mail messages 27, in multiple folder hierarchies with each hierarchy associated with the server providing the server based items. The messaging system is capable of handling messages for both flat folder storage architecture and the new hierarchical folder storage architecture.

Figure 2:
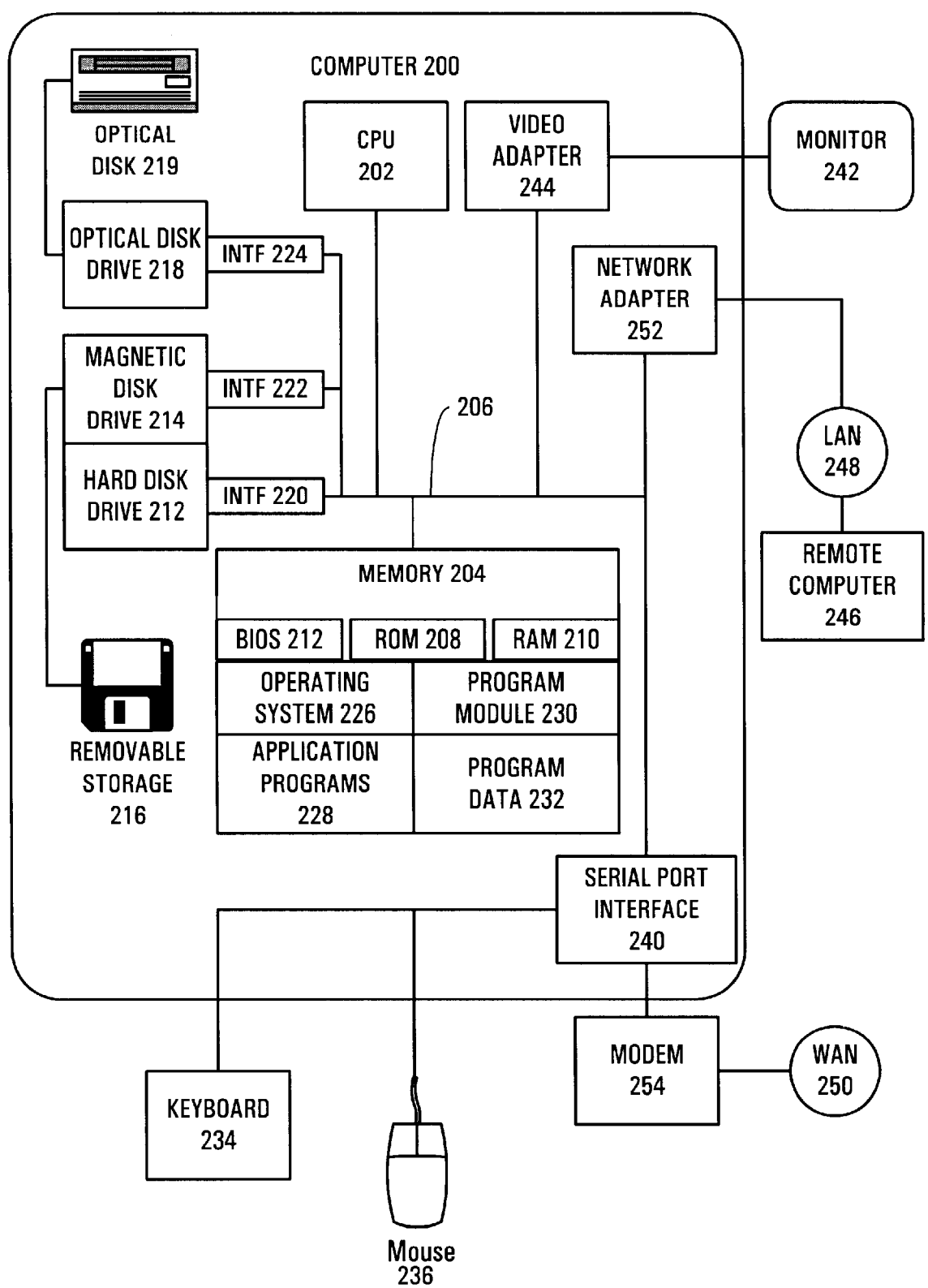
FIG. 2 illustrates a logical block diagram for a hand-held computer according to an example embodiment of the present invention.

FIG. 2 and the following discussion are intended to provide a brief general description of a suitable computing environment in which the invention may be implemented. One possible embodiment of a Handheld PC, which is one type of hand-held computer 22, incorporates a computer 200 having at least one central processing unit (CPU) 202, a memory system 204, an input device 234, and an output device 244. These elements are coupled by at least one system bus 206.

The CPU 202 is of familiar design and includes an Arithmetic Logic Unit (ALU) for performing computations, a collection of registers for temporary storage of data and instructions, and a control unit for controlling operation of the system. The CPU 202 may be a microprocessor having any of a variety of architectures including, but not limited to those architectures currently produced by Intel, Cyrix, AMD, IBM and Motorola.

The system memory comprises a main memory 204, in the form of media such as random access memory (RAM) 210 and read only memory (ROM) 208, and may incorporate a secondary storage in the form of long term storage mediums such as hard disks 214, floppy disks 216, tape, compact disks (CDs) 219, flash memory, etc. and other devices that store data using electrical, magnetic, optical or other recording media. The main memory may also comprise video display memory for displaying images through the output device 242, such as a display device. The memory can comprise a variety of alternative components having a variety of storage capacities such as magnetic cassettes, memory cards, video digital disks, Bernoulli cartridges, random access memories, read only memories and the like may also be used in the exemplary operating environment. Memory devices within the memory system and their associated computer readable media provide non-volatile storage of computer readable instructions, data structures, programs and other data for the computer system.

The system bus may be any of several types of bus structures such as a memory bus, a peripheral bus or a local bus using any of a variety of bus architectures. The input and output devices are also familiar. The input device can comprise a keyboard, a mouse, a microphone, a touch pad, a touch screen, etc. The output devices can comprise a display, a printer, a speaker, a touch screen, etc. Some devices, such as a network interface or a modem can be used as input and/or output devices. The input and output devices are connected to the computer through system buses 206.

The architecture similar to that described above can be used with other types of hand-held computers 22, desktop PC's 26, and servers 24. The computer system further comprises an operating system and usually one or more applications or programs. The operating system comprises a set of programs that control the operation of the system, control the allocation of resources, provide a graphical user interface to the user and includes accessory and utility programs. An example of an operating system that can run on the hand-held computer is the "WINDOWS CE" operating system, which also is commercially available from Microsoft Corporation. A program is software that runs on top of the operating system software and uses computer resources made available through the operating system to perform application specific tasks desired by the user.

Figure 3:
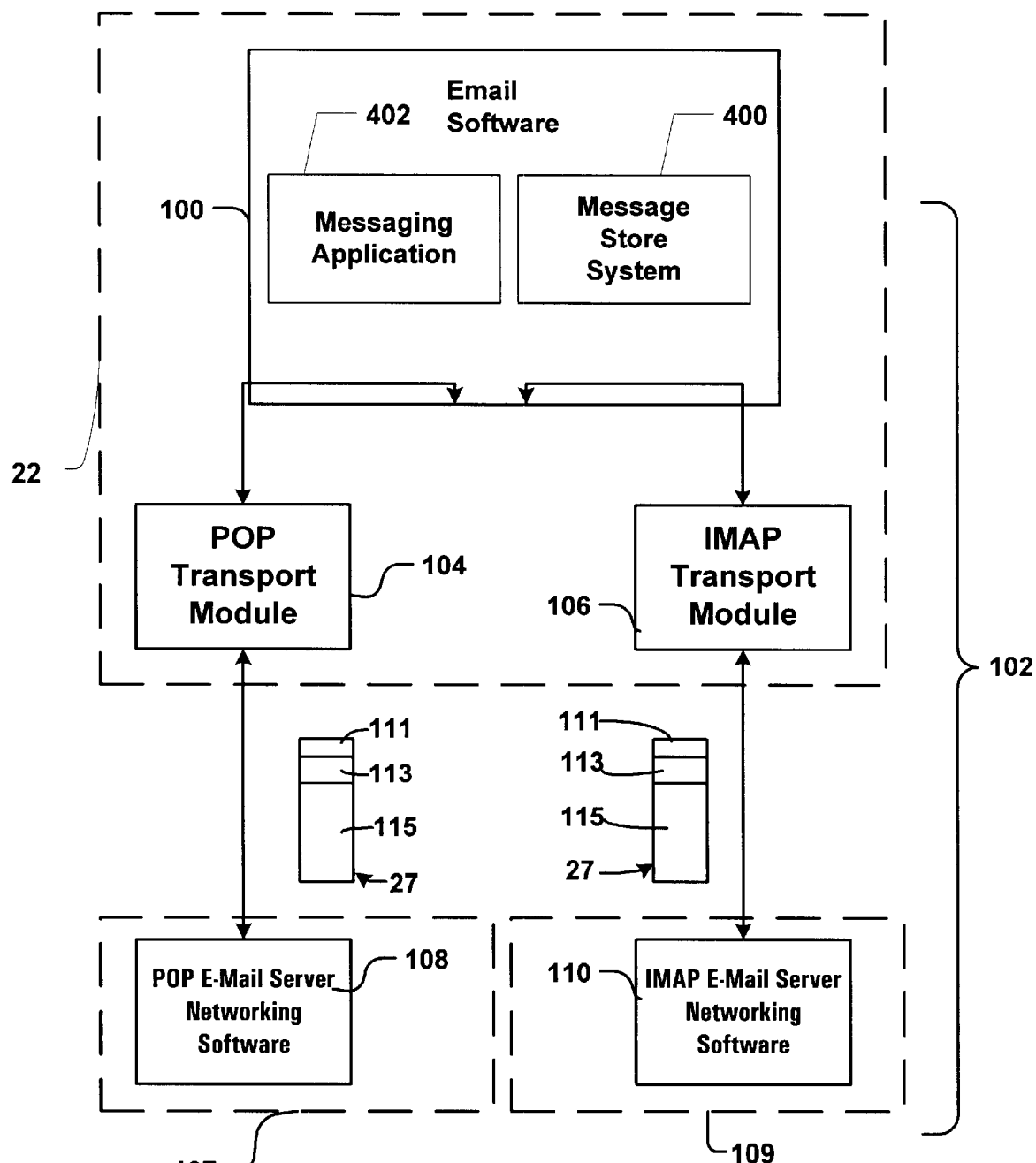
FIG. 3 illustrates a logical block diagram for an electronic message retrieval system according to one embodiment of the present invention.

In one possible embodiment as illustrated in FIG. 3, the e-mail software is a program such as the "INBOX" e-mail application 100 that is commercially available from Microsoft Corporation, and is packaged with the "POCKET OUTLOOK" suite of programs. In yet another possible embodiment, the e-mail software can be integrated into, or otherwise form a part of, the operating system. The e-mail application 100 running on the Handheld PC or Palm-size PC interacts with a remote server 109 or 107 to create an e-mail retrieval system 102.

The e-mail software 100 works directly with communication software known as transport modules. One module is a POP transport module 104 and another is an IMAP transport module 106. The POP transport module 104 is a network communications layer designed specifically to communicate with POP communications software 108 located on a POP e-mail server 107. POP server 107 is a particular embodiment of the server 24 (FIG. 1). Alternatively the e-mail software 100 communicates via the IMAP transport module 106, which is a network communication layer designed to communicate with IMAP software 110 on an IMAP e-mail server 109. IMAP server 109 is another embodiment of the server 24 (FIG. 1). Depending on whether hand-held computer 22 is configured to communicate with server 107 or 109, transport module 104 or 106 is used. The user configures the hand-held computer 22 to communicate via a particular transport based on their particular e-mail account and the protocol employed by the e-mail server. However, with respect to the e-mail software 100, the requests, commands and responses are typically the same regardless of which transport module 104 or 106 is used. There are some commands, such as data-restricted message retrieval, that depend on the transport type.

The e-mail software 100 sends command requests to the transport module 104 or 106 requesting actions be performed by the server 107 or 109. Such actions might be to retrieve server based items such as e-mail messages. When a request is received by the module 104 or 106, the module 104 or 106 converts the command into data signals that are sent to the e-mail server 107 or 109 over the network connection. The e-mail server 107 or 109 and its networking software 108 or 110 receives these data signals, compiles the signals, analyzes the signals and performs the requested operations in response to the signals. Once the server 107 or 109 performs the operations, the server returns information to the transport module 107 or 109 either acknowledging the operation was completed successfully or that an error occurred.

The response from the server also includes the data requested by the software 100. The response is in the form of data signals that are sent to the module 104 or 106, which compiles the data signals into a meaningful response and transports the response to the e-mail software 100. The software 100 is then able to parse and use the response accordingly. The subject of the requests from the software 100 to the server 107 or 109 relate to e-mail messages 27. Each e-mail message 27 is an electronic document that is made up of at least three elements, an identification element (ID) 111, header information 113, and a message body 115. The ID 111 is used internally by the hand-held computer 22 or the server 24 to identify the message and may be simple such as an integer or more complex such as a file name or other ID string. The header 113 has information about the e-mail message 27 such as originator, addressee, time created and the subject of the e-mail message 27. The header 113 may include other fields as described hereinafter. The body 115 is the actual message created by the creator of the e-mail message and may include text, graphics, other files or attachments.

Figure 4:
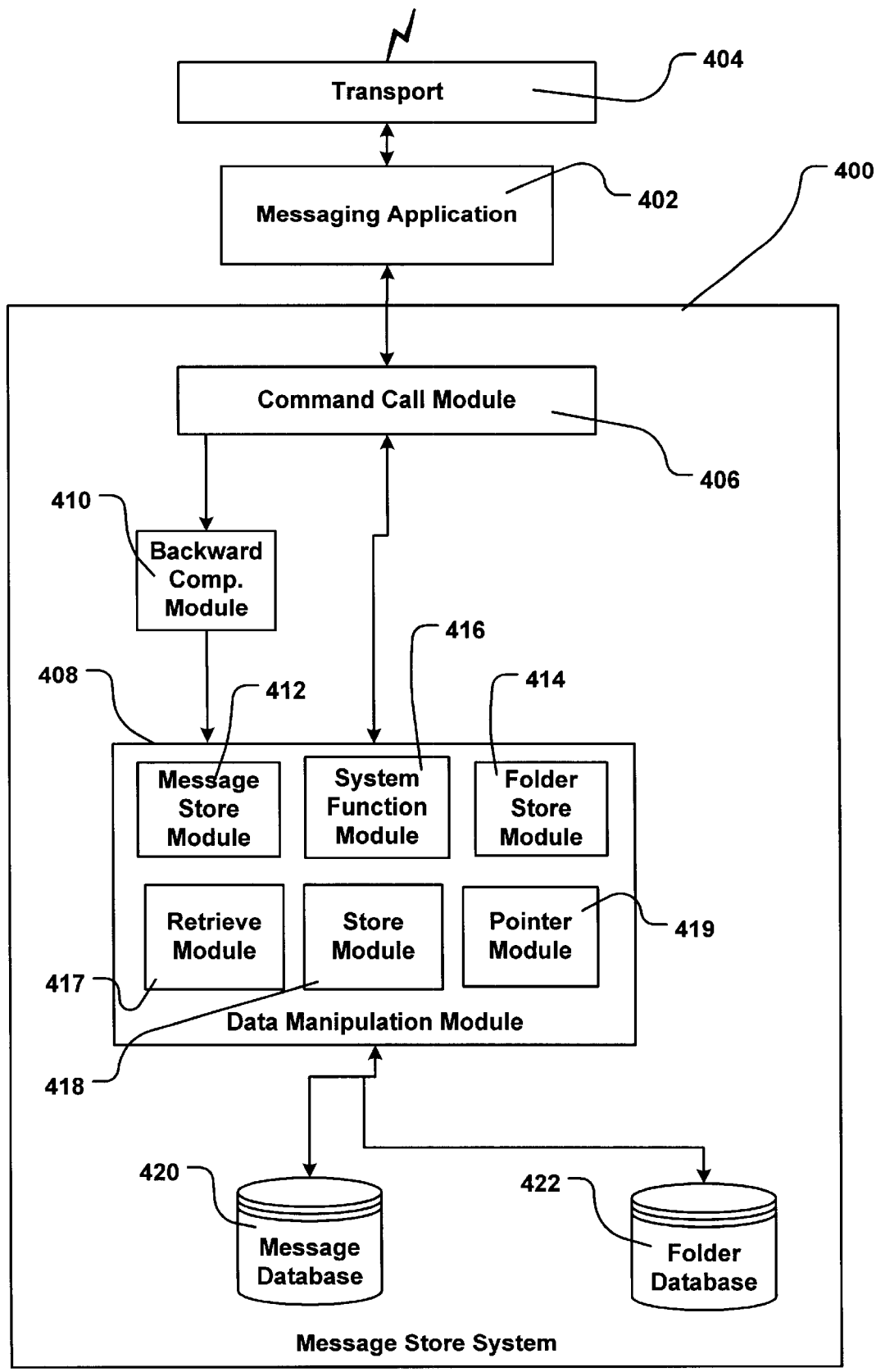
FIG. 4 illustrates a logical block diagram for a processing system within a message store system according to an example embodiment of the present invention.

FIG. 4 shows one embodiment of a message store system 400 in accordance with the invention. In one possible embodiment, the message store or mail store system is a part of the e-mail software 100 in FIG. 3. In other possible embodiments, the message store is a program that is separate from, but may interface with, the e-mail software 100. The message store system runs on top of the operating system in the hand-held computer 22 and interfaces with messaging application 402. Messaging application 402 performs PIM operations, such as e-mail, calendars, tasks, etc., on the hand-held computer and also potentially handles the communications with a server computer or desktop computer through transport 404.

Message store commands from the messaging application 402 are received by the command call module 406. The message store commands may be in the form of the standard mail store API commands or in the form of the new extended mail store API commands. These extended mail store API commands follow the protocol of the extended mail store API's. Command call module 406 passes extended API commands directly to the data manipulation module 408. The extended API commands are the commands required to create and use the hierarchical folder structure. The data manipulation module 408 executes the extended API commands to implement the operations performed on the hierarchical folder structure in the new mail store system.

If the message store command is in the form of a standard mail store command working with a flat folder structure, then command call module 402 passes the standard API command to the backward compatibility module 410. Backward compatibility module 410 translates the standard API command to an extended API command. Module 410 also converts the parameters in the standard API command to the parameters required for the extended API command. The resulting extended API command is then executed by the data manipulation module 408.

Data manipulation module 408 includes multiple functional modules for executing the extended API commands. Message store module 412 executes commands to organize messages in the folders. Folder store module 414 executes commands to create and manipulate the hierarchical folders. System function module 416 performs mail store system functions such as initialization and memory management. The retrieve, store and pointer modules 417, 418 and 419 respectively, execute extended API commands to read and write data on the message database 420 and the folder database 422. In one possible embodiment, the databases 420 and 422 are programmed to remove "stale" records as needed. This database scheme conserves memory on the hand-held computer 22. In another possible embodiment, furthermore, all of the records in the message database 420 and the folder database 422 can be stored in a single database.

FIG. 5 illustrates an example of a group of folder hierarchies. Each folder that is created by the folder store module 414 in the hand-held computer 22 is organized inside a folder hierarchy. Each folder hierarchy includes a root, or top-level, folder that may have one or more subfolders. The root folders do not contain messages, only subfolders. Each subfolder may have one or more sub-sub folders, and so on. In this embodiment, each root folder and its subfolders form a separate folder hierarchy.

Each folder is identified with a 16-bit folder ID. Accordingly, the messaging system can create and organize over 65,000 folders, and in one possible embodiment can have up to 65,536 folders. These folders can be organized into virtually any structure of root folders and subfolders that the user desires. In one possible embodiment, any combination of folders and subfolders is possible. In another possible embodiment, any combination is possible, except that the default hierarchy can have no more than 255 folders and only one level of folders.

The default hierarchy is used when the message store is called by an older messaging application via standard mail store API commands. The default folder hierarchy provides backward compatibility, as it is the only hierarchy visible to older messaging applications. In lieu of the program specifying anything regarding a hierarchy, the default is used. As discussed in more detail, all of the messages in non-default folder hierarchies will be then presented to the older messaging application as if they are collected into a single specific folder, named "Other," in the default hierarchy folder structure. No such folder actually exists; it is simulated to allow presentation of messages from the non-default hierarchies to the older messaging applications.

Furthermore, another specific folder, named "Embedded," in the default hierarchy folder structure is reserved for the storage and management of messages that are attached to other messages. This reserved folder is hidden, as illustrated by the dashed lines, and is not included in the user interface displayed on the hand-held computer 22. In this structure, messages attached to other messages never have to be moved when the main message is moved. This structure also prevents a user from deleting the attached message, by means other than deleting its containing message. Additionally, the message store module 412 includes code that, when a message deletion is requested, deletes corresponding attached messages as well, if any are present.

In the example illustrated in FIG. 5, there are three root folders 500, 512, and 526. The first root folder 500 is named Default Hierarchy and is a parent for an Inbox folder 502, an Outbox folder 504, a Sent folder 506, hidden "Embedded" folder 508, and a simulated "Other" folder 510. The second root folder 512 is named Service 1 and is a parent for an Inbox folder 514, an Outbox folder 516, a Sent Folder 518, and a User Defined folder 520. The User Defined Folder, in turn, is a parent to User Defined folders 522 and 524. The third root folder 526 is named Service 2 and is a parent for an Inbox folder 528, an Outbox folder 530, a Sent Folder 532, and a User Defined folder 534. The first root folder 500 forms the root for a default folder hierarchy 536. The second and third root folders 512 and 526 form the root for non-default folder hierarchies 538 and 540, respectively.

The hierarchical folder structure illustrated in FIG. 5 is only an example. Many other possible embodiments and hierarchical folder structures are possible. Additionally, other possible embodiments might include code in the folder store module 414 that places limits on the number of folders that a user can create and the structure of folders that a user can create. For example, the folder module 414 might automatically create an Inbox, Outbox, and Sent subfolders for each hierarchy that the user creates. These subfolders are used by the messaging application 402 in managing messages as they are received from and sent to the messaging service. In another example, the folder store module 414 might limit or control the number and type of folder hierarchies that a user can create.

Figure 6A:
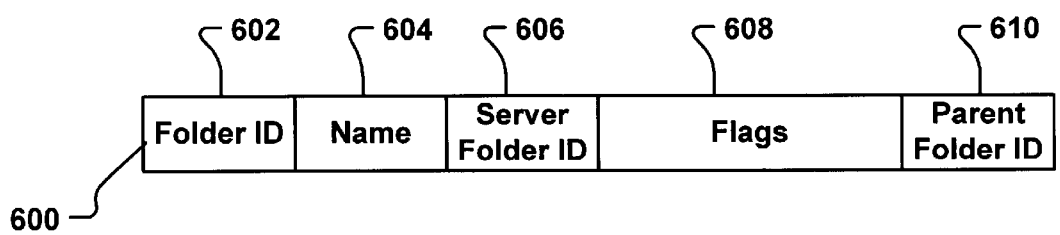
FIG. 6A illustrates a data record stored within a folder database of a message store system according to one embodiment of the present invention.

Referring now to FIG. 6A, each folder stored in the folder database 422 of the hand-held computer 22 has a folder data structure 600 that includes fields relating to data for a folder ID 602, a folder name 604, a server folder ID 606, flags 608, and a parent folder ID 610. Both the folder ID and the parent folder ID are 16-bit binary values. As each folder is generated by the folder module 414, a record in the folder database 422 is created and a folder ID value is stored in the folder ID field. Within the default folder hierarchy, all folders have a folder ID equal to or less than 255. All folders within non-default folder hierarchies have a folder ID value equal to or greater than 256. No two folders have the same value for a folder ID.

The parent folder ID is the folder ID for the next most dominant folder-in a given folder hierarchy. The parent folder ID assigned to root folders is a predetermined value between 0 and 65,535 that indicates the folder is a root and does not have a parent. In one possible embodiment there is only one root folder assigned in the folder ID range of 0–255. All other root folders are in the range from 256–65, 535.

The name field 604 contains alphanumeric data representing the name for the folder. The flag field 608 contains binary flags used in managing the folders. Each flag is a bit in a 32-bit value and is used for a specific function. For example, the flag field is used in the synchronization of folders, it allows for various folder properties to be defined, and it communicates certain changes in the folder state on the hand-held computer 22 to the messaging application during the synchronization process.

The server folder ID field 606 contains data identifying the corresponding folder on the server 24. The value for the server folder ID is determined during synchronization of folders between the message store on the hand-held computer and the messaging system on a server 24.

One possible application for this exemplary embodiment is a folder hierarchy set up for each messaging service from which a user receives e-mails. The first root folder 512 and its subfolders 514–524 store and organize messages received from a first messaging service such as one used for a work e-mail account. The second root folder 526 and its subfolders 528–534 store and organize messages received from a second messaging service such as a messaging service to which a user subscribes for a personal e-mail account.

In order to allow a user to set up multiple e-mail accounts with the same server, folder data structure 600 needs to contain information uniquely identifying a folder as belonging to a particular user e-mail account. In one possible embodiment, the server folder ID field contains information about both the e-mail server and the user account. These server folder IDs are generated by an appropriate transport during folder synchronization and are likely to be globally unique. Their uniqueness requirements are determined by the mail server and transport provider in use and are otherwise not relevant to the message store system. In another possible embodiment, folder data structure 600 includes separate fields for the server name and user e-mail account information.

Figure 6B:
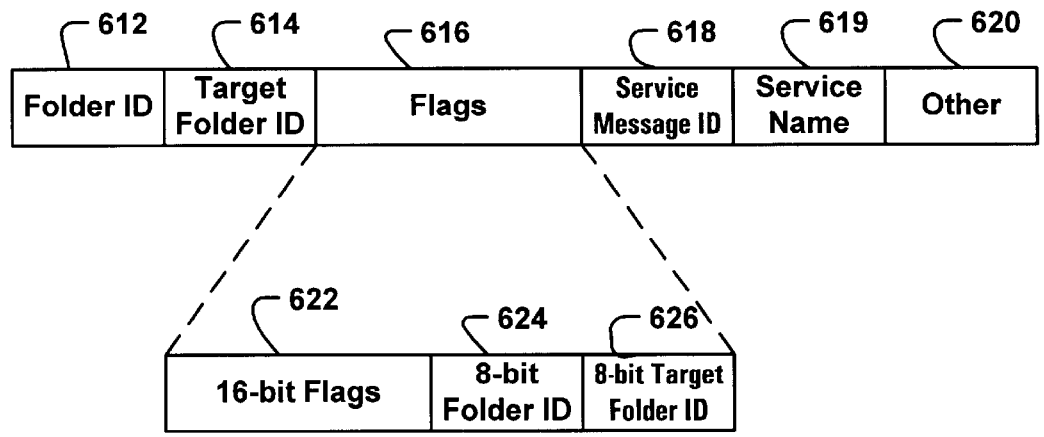
FIG. 6B illustrates a data record stored within a message database of a message store system according to one embodiment of the present invention.

Referring now to FIG. 6B, the message data structure generated for each message by the message module 412 in the hand-held computer 22 includes a folder ID field 612, a target folder ID field 614, a flag field 616, a server message ID field 618, and a service name field 619. The message data structure also can include some other fields 620 that store data used for managing the messages. Examples of such data include keywords used to relate records in the message database with records in the folder store and data identifying any files that were attached to the message. The fields that form the message data structure are stored in the message store with other information relating to the message including header information and the text of the message.

The folder ID is the value of the folder ID for the corresponding folder under which the message is stored. If a user moves a message from one folder to another while off-line, the folder ID to which the user is moving the message is stored in the target folder ID field 614. The folder ID of the original folder location remains in the folder ID field. The folder ID stored in the target folder ID field 614 is written into the folder ID field 612 during the synchronization process. This use of a target folder ID preserves the original location of the message object so that it can be compared to the corresponding message object in the server's 24 messaging system and updated accordingly.

The flags field 616 is a 32-bit value. Sixteen of the flag bits in the flags field 616 are stored in a 16-bit flags field 622 and are used in a conventional manner during the synchronization process. These sixteen bits allow for various message properties to be defined and communicate certain changes in the message on the hand-held computer 22 to the server 24 during the synchronization process. Eight of the flag bits correspond to an 8-bit folder ID and are stored in an 8-bit folder ID field 624, and eight of the flag bits correspond to an 8-bit target folder ID and are stored in an 8-bit target folder ID 626. When the messaging application calling the message store is an older messaging application that uses standard mail store API commands, the 8-bit folder ID and the 8-bit target folder ID will be used in lieu of the folder ID and the target folder ID for backward compatibility purposes.

If the folder ID has a binary value of 255 or less, the 8-bit folder ID embedded in the flags has the same value as the folder ID. The 8-bit target folder ID embedded in the flags similarly mirrors the target folder ID. If the folder ID has a binary value of 256 or greater, the 8-bit folder embedded in the flags has a predetermined value that is hard coded in the messaging system software. This predetermined value represents the simulated "Other" folder 510 that is reserved in the message store. As discussed in more detail below, any message that has this predetermined value embedded in its flags appears to older messaging applications to be stored in this reserved folder 510. This mechanism permits messages in the non-default folders to be accessible to the older messaging applications that use standard mail store API commands.

The server message ID field 618 contains data identifying the corresponding message that is stored on the server. The value for this data is determined during the synchronization process. The service name field 619 contains data identifying the service that was used to communicate the message.

Figure 7:
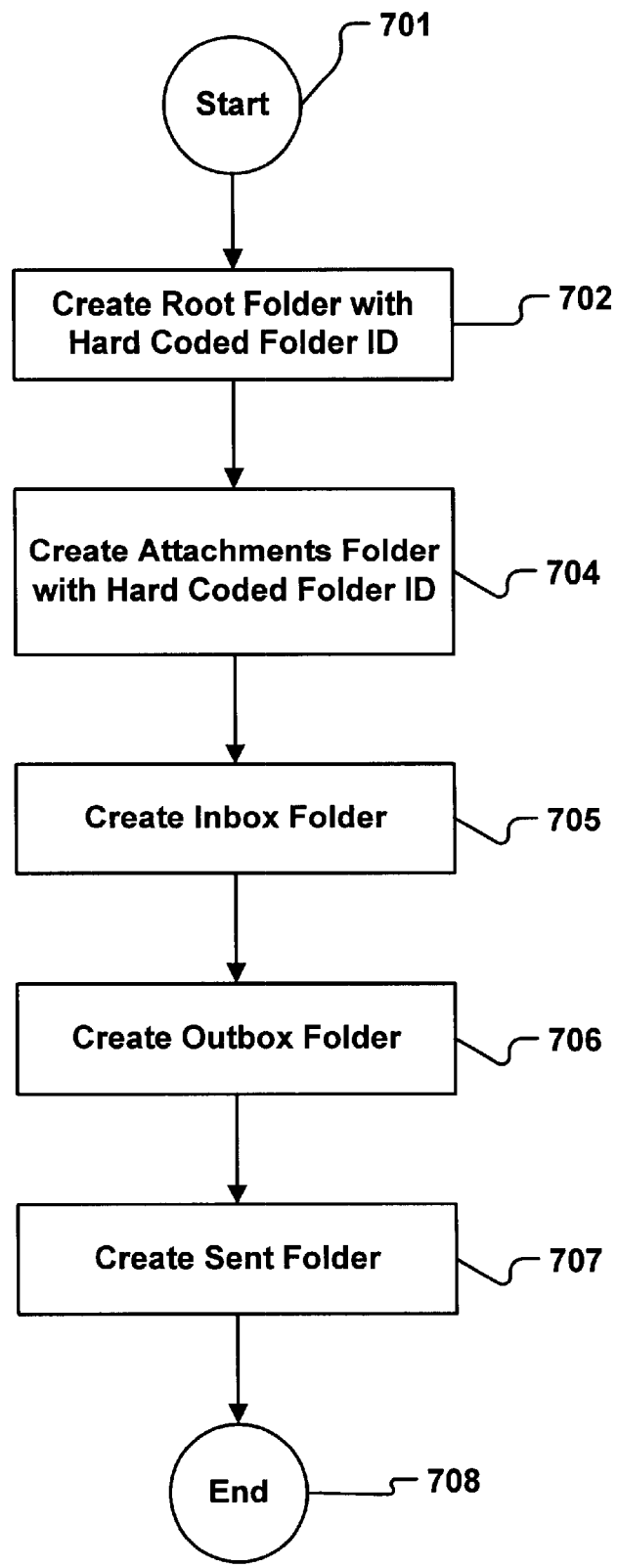
FIG. 7 illustrates a logical operational flow diagram for the processing operations performed by a message store system when creating a default hierarchy according to one embodiment of the present invention.

Referring to FIG. 7, creation of the default hierarchy of folders involves several operations including several initialization operations for the system folders present in the default hierarchy. One of the initialization operations initializes the message and folder database. A root folder operation 702 then creates the root folder for the default hierarchy and assigns the binary value of 250 as the folder ID. Subsequent operation 704 creates the "Embedded" folder, whose folder ID value is also hard coded by the folder store module 414 to be 251. As discussed above, the folder entitled "Other" is a simulated folder and requires no creation. Special folder ID value assigned to this simulated folder is 249.

When the folder database 422 is being loaded and initialized in the hand held-computer, the folder store module 414 automatically creates the "Embedded" folder, as well as an Inbox folder, Outbox folder, and Sent folder, in the default folder hierarchy. An Inbox operation 705 creates the Inbox folder and assigns a binary value of 254 as the folder ID for the Inbox folder. The Inbox operation 705 also sets the value for the parent folder ID equal to the folder ID of the root folder. Similarly, the Outbox operation 706 creates an Outbox folder by assigning a binary value of 253 as the folder ID for the output folder, and setting the value of the parent folder ID for the Outbox folder to the folder ID of the root folder. The Sent operation 707 creates a Sent folder assigning a binary value of 252 as the folder ID for the Sent folder, and setting the value of the parent folder ID for the Sent folder to equal the folder ID of the root folder. In one possible embodiment, the folder ID values for the default root folder, "Other" folder, "Embedded" folder, Inbox folder, Outbox folder, ad Sent folder are hard coded or reserved.

Figure 8:
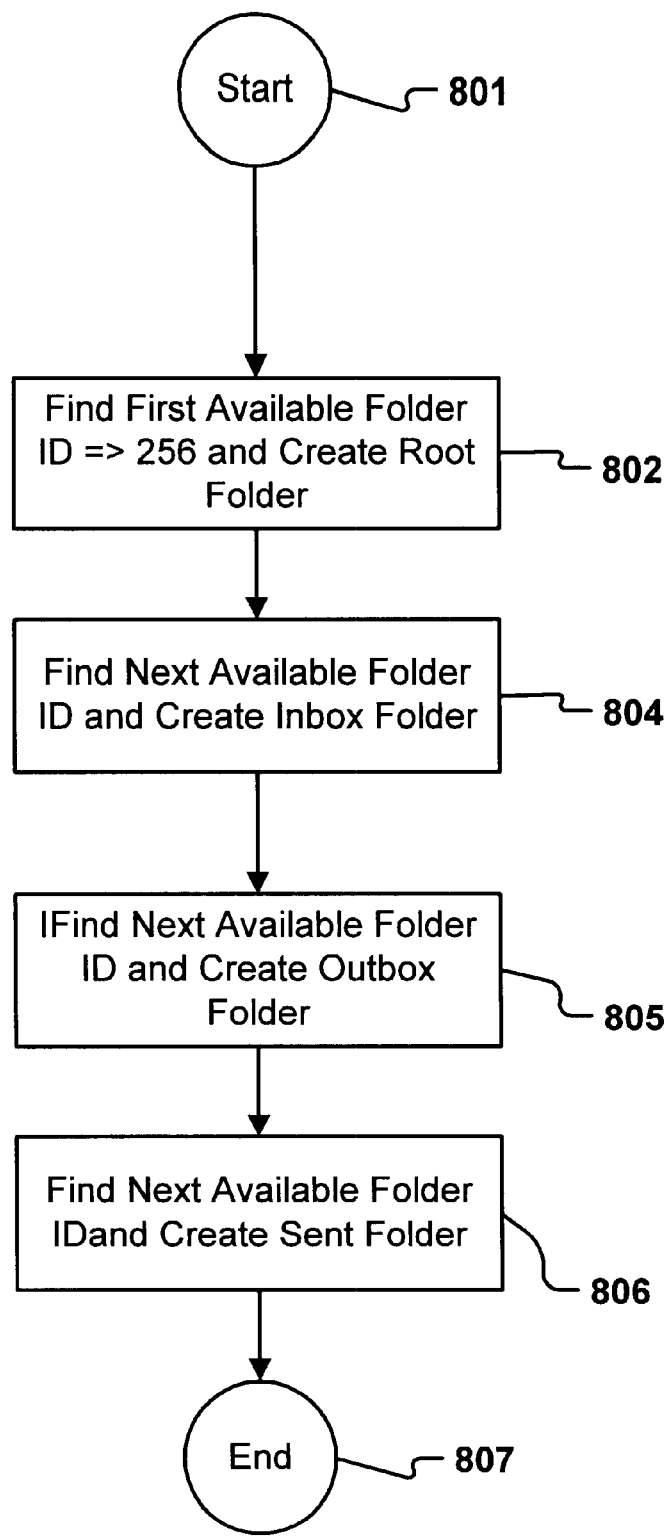
FIG. 8 illustrates a logical operational flow diagram for the processing operations performed by a message store system when creating a non-default hierarchy according to one embodiment of the present invention.

Referring to FIG. 8, when a user subscribes to a new messaging service, the message store system executes several operations including a find-next available folder ID operation 803, which is performed to find the first available folder ID that is not currently in use. This folder ID value is used as the folder ID for the root folder in the new folder hierarchy. The find-next available folder ID operation 803 sequentially searches the folder database, starting at the database record that would correspond to the folder data structure record having a folder ID of 256 until it fails to find a requested folder ID value, and thus locates an entry in the folder database that is not in use. The folder ID corresponding to that absent entry in the folder database becomes the folder ID for the folder that is currently being created. A root-folder operation 803 creates a root folder for the new messaging service. The first root folder created for a non-default hierarchical folder structure will have a binary value of 256.

After the root folder is created, an Inbox operation 804 then creates the Inbox folder by once again finding the next available folder ID and then assigning that value as the folder ID for the Inbox folder. The Inbox operation 804 also sets the value for the parent folder ID to equal the folder ID for the root folder. Similarly, the Outbox operation 805 finds the next available folder ID and assigns the returned value to the folder ID for the Outbox folder. The value for the parent folder ID is set equal to the folder ID for the root folder. A Sent operation 806 finds the next available folder ID and assigns the returned value to the folder ID for the Sent folder. The value for the parent folder ID is set equal to the folder ID for the root folder.

Figure 9:
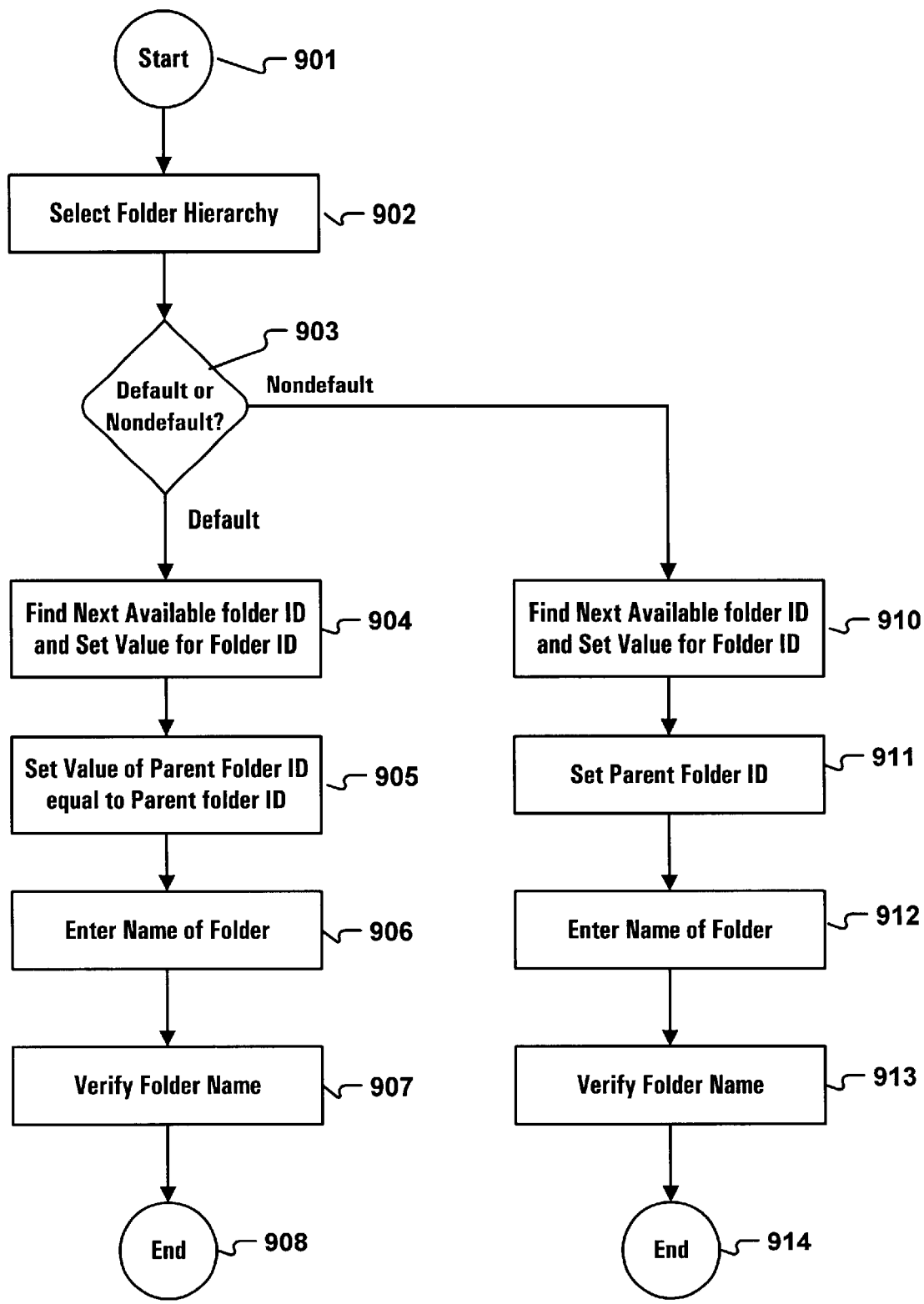
FIG. 9 illustrates a logical operational flow diagram for the processing operations performed by a folder module when creating a new folder according to one embodiment of the present invention.

Referring to FIG. 9, the folder store module 414 includes operations for creating a new folder. A selection operation 902 prompts the user to select a parent folder under which the new folder will be added. If the user selects a parent folder in the default hierarchy, a folder ID operation 904 finds the next-available folder ID between 0 and 255 using a search technique similar to that outlined above and then sets the value of the folder ID to the requested value that the search failed to find in the folder database. If the search fails to find any available folder ID's between 0 and 255, the folder store module 414 generates an error indicating that no more folders can be created in the default folder hierarchy. Parent Folder ID operation 905 then sets the value of the parent folder ID to the folder ID for the root of the default hierarchy. A naming operation 906 then prompts the user to enter a name for the folder. A verification operation 907 verifies whether the folder name entered by the user is valid. If the folder name is valid, the folder store stores the folder data structure in the folder store. The name-verification operation 907 is described in more detail below.

If the user selects a folder hierarchy other than the default folder hierarchy, a folder ID operation 910 finds the next available folder ID that is greater than 256 using a search technique similar to that outlined above and sets the value of the folder ID to the requested value that the search failed to find in the folder database 422. A naming operation 912 prompts the user to enter a name for the folder. The parent ID operation 911 then sets the value of the parent folder ID for the newly created folder to equal the folder ID of the parent folder specified by the user earlier. If the device is currently connected to the server, corresponding folder is created on the server and its ID is stored as the server folder ID in the newly created folder record. If the device is not currently connected to the server, the corresponding server folder will be created during folder synchronization the next time connection to the server is established. A verification operation 913 verifies whether the folder name entered by the user is valid. If the folder name is valid, the folder store module 414 stores the folder data structure in the folder database 422.

Figure 10:
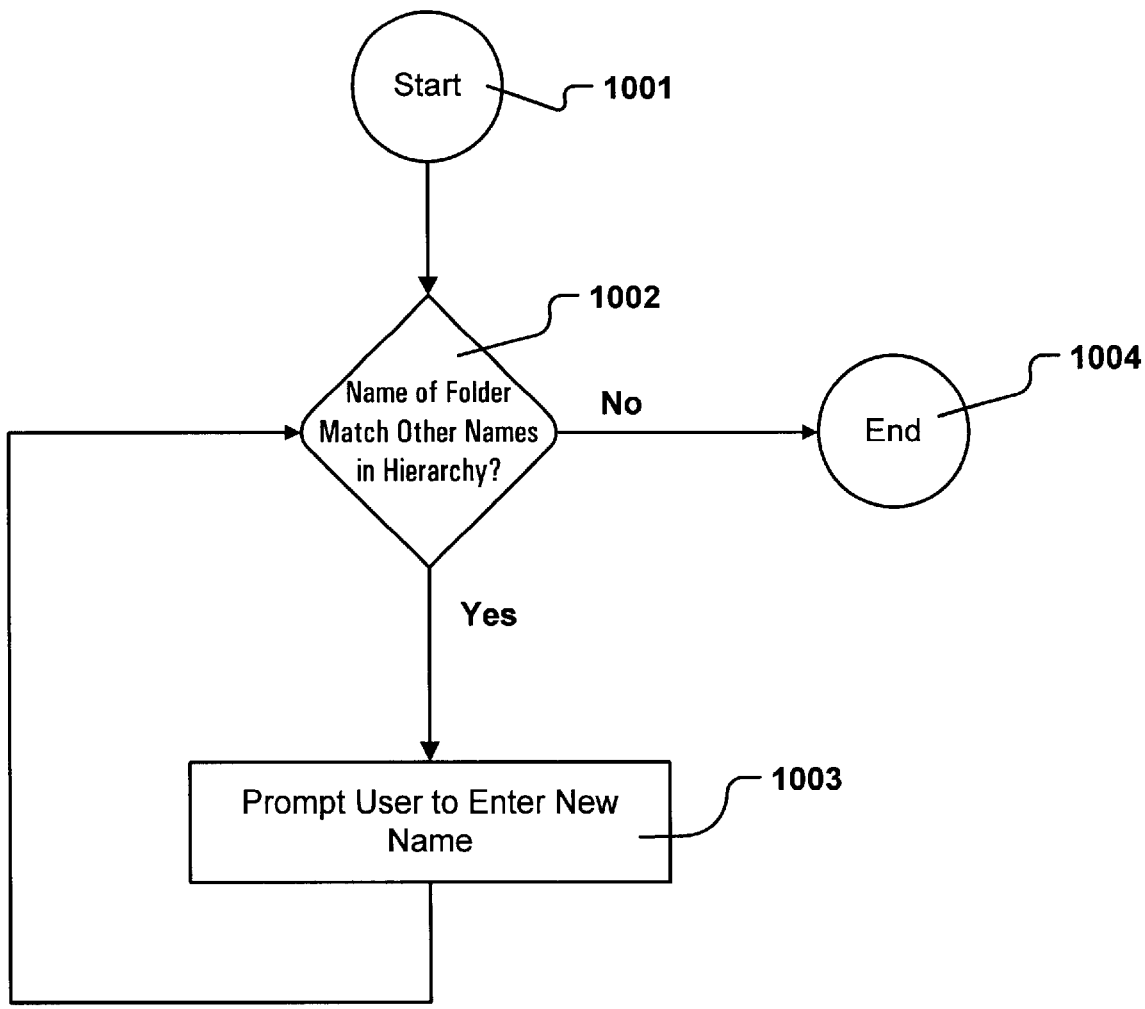
FIG. 10 illustrates a logical operational flow diagram for the processing operations performed by a folder module when verifying a new folder name according to one embodiment of the present invention.

Referring to FIG. 10, the name-verification operation 913 includes several operations itself that verifies whether the user has entered a valid character string in the name field when a new folder is created. When a user creates a new folder within an existing hierarchy, a compare operation 1002 compares the name entered by the user with the names in the folder structure for each of the other subfolders of the new folder's parent folder. If the new name entered by the user matches a name of one of these subfolders, a prompt operation 1003 determines that the name is invalid and prompts the user to enter a new name. After the new name is entered, the compare operation 1002 is re-executed to verify the validity of this new name. In this configuration of the name-verification code, the same name can be used for two folders that have different parent folders, but not for two folders that are subfolders of the same parent folder. This process is also completed when the message store system 400 creates a new folder hierarchy to ensure that the name assigned to the root folder in the folder hierarchy is not the same as the name of a root folder of another hierarchy.

Figure 11:
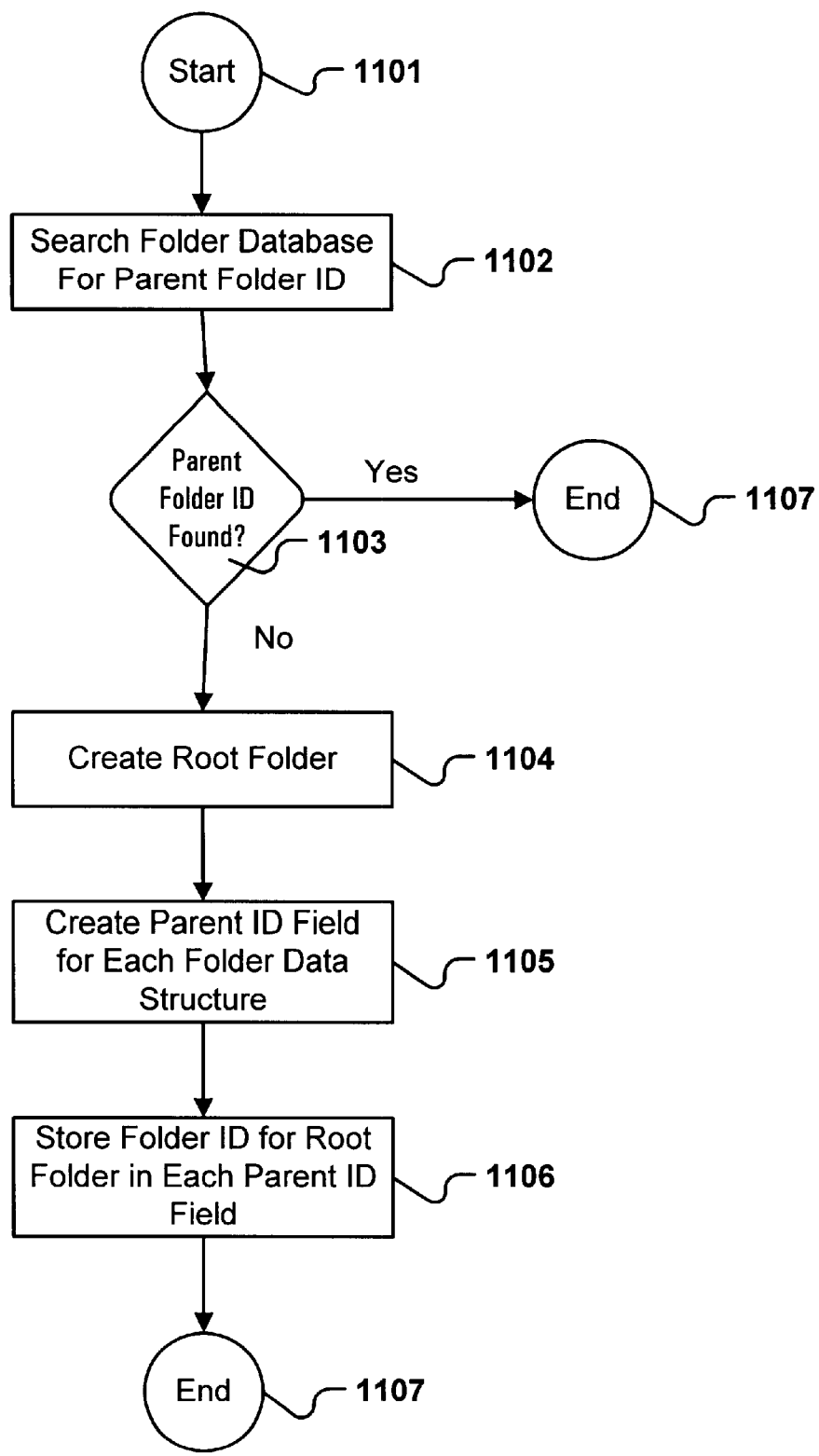
FIGS. 11–13 illustrate a logical operational flow diagram for the processing operations performed by a message store system when updating message and folder databases according to one embodiment of the present invention.
Figure 12:
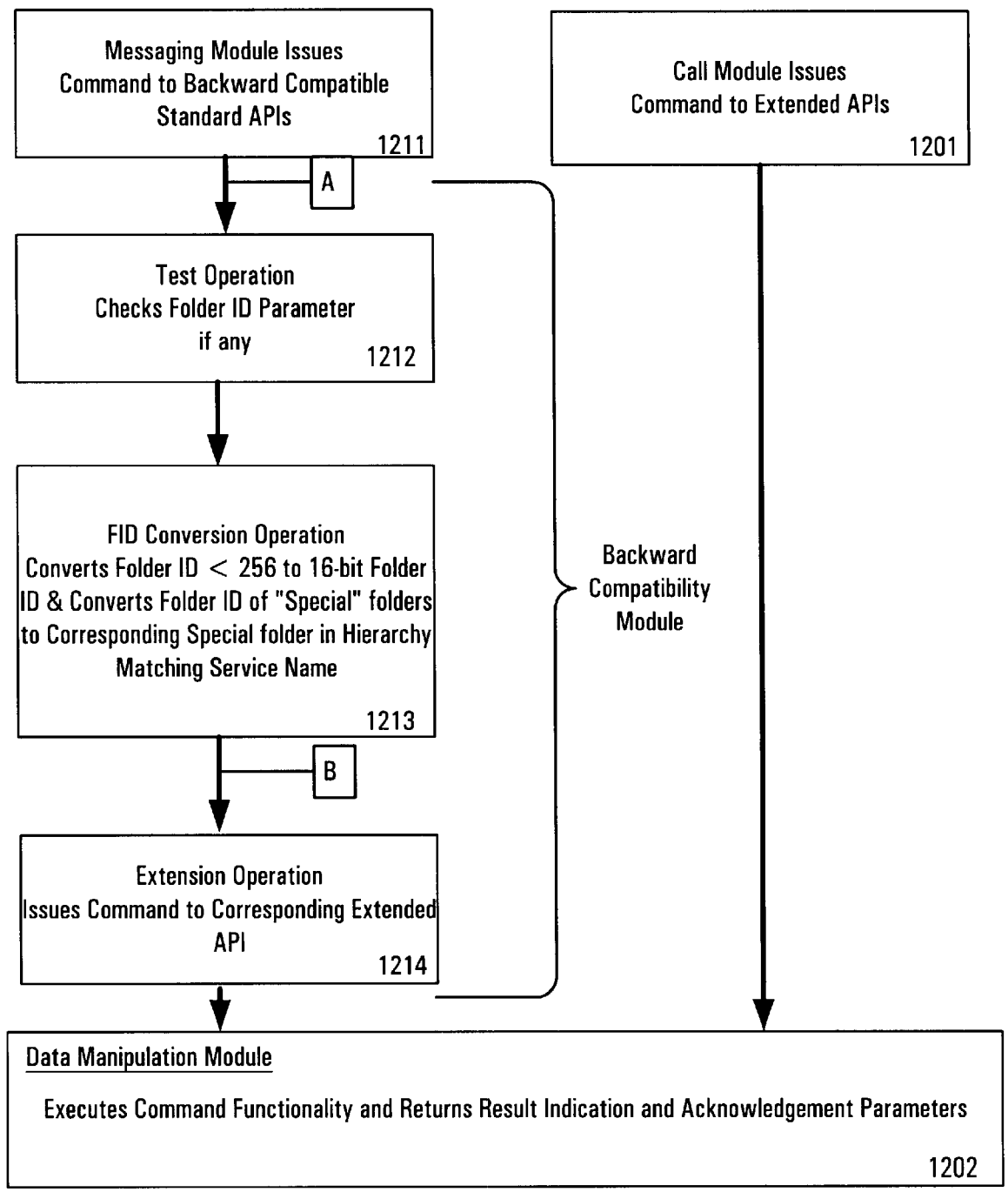
Figure 13:
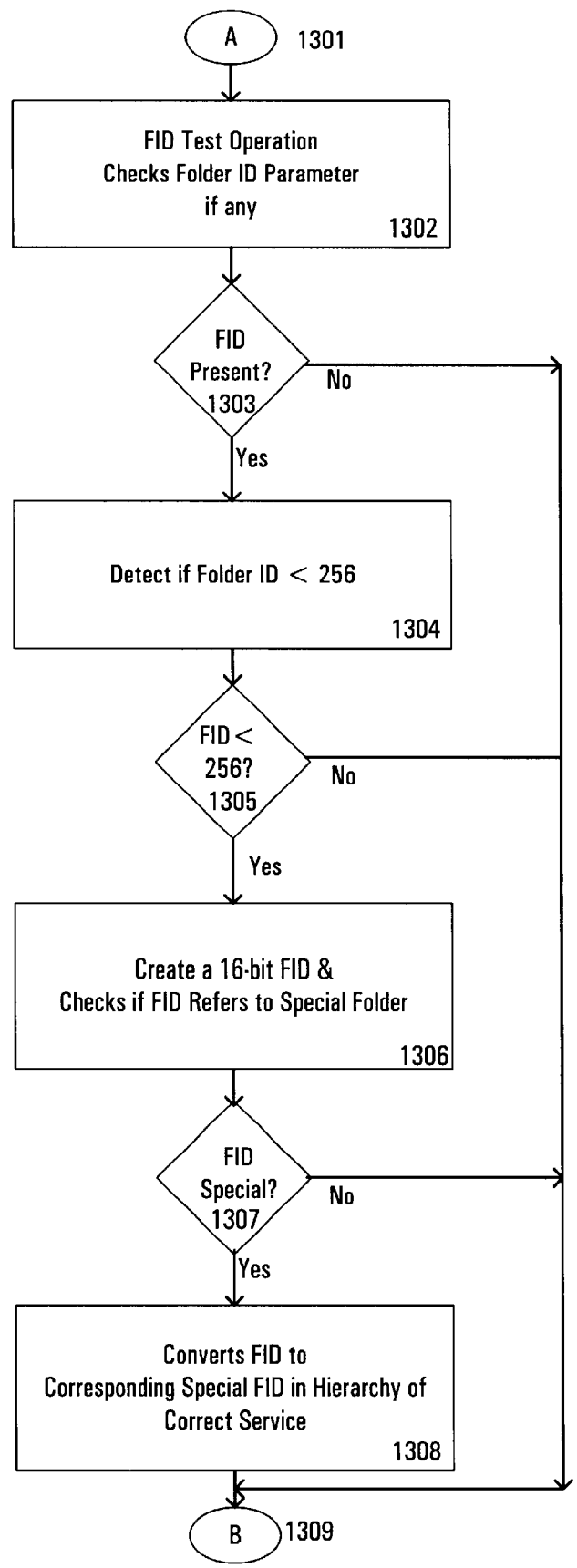

Referring to FIG. 11, the folder store module 414 (FIG. 4) also includes upgrade code that is executed when a user initially upgrades the program on the hand-held computer to utilize a hierarchical folder structure. When the upgrade code is executed, a verification operation 1102 searches the folder database for parent folder ID's. If no parent folder ID's are found, the verification operation 1102 determines that none of the folder structures for the stored folders contain a parent folder ID field, and thus only a flat folder structure currently exists in the folder database. In other words, the verification operation determines that the folder database is an older version of the message store database and thus none of the folders in the folder database is assigned to a parent folder.

Operations 1104 and 1105 then create a root directory and modify the data structure, respectively, for each of the folders to add a field for a parent ID. Another operation 1106 stores the folder ID for the newly created root directory in the parent ID field for each of the folders that were preexisting in the database being upgraded. In one possible embodiment, the newly created root directory is the root directory for the default folder hierarchy.

An example of these operations can be illustrated using the folders shown in FIG. 5. Suppose a user subscribes to a first e-mail service. The root folder ID for the first non-default folder hierarchy is a binary 256. The Inbox, Outbox, and Sent folders have folder ID's equal to 257, 258, and 259, respectively. Now suppose, the user subscribes to a second messaging service. A folder hierarchy for this second messaging service will have a root folder with a folder ID of 260. The second folder hierarchy will also include an Inbox folder, Outbox folder, and Sent folder having folder ID's equal to 261, 262, and 263, respectively.

If the user next defines a first user-defined folder in the first folder hierarchy, it is assigned a folder ID of 264 and has a parent folder ID of 256. If the user next defines a second user-defined folder in the second folder hierarchy, it is assigned a folder ID of 265 and has a parent folder ID of 260. If the user next defines a first subfolder of the first user defined folder, it is assigned a folder ID of 266 and a parent folder ID of 264. Similarly, if the user defines a second subfolder of the first user defined folder, it is assigned a folder ID of 267 and a parent folder ID of 264.

In use, new messages are delivered to the message store system 400 in the hand-held computer 22 during the synchronization process. During this procedure, the data manipulation module 408 identifies the set of folders that corresponds to the service for which the connection is being established. This set of folders includes the Inbox folder and any other folder associated with that service and requiring synchronization with the server. The data manipulation module 408 then goes through the folders within that set of folders in an iterative process and synchronizes the messages between folders on the hand-held PC 22 and the server 24. Any new messages that are delivered to the device as a result of this procedure have their folder ID field set to the ID of the folder they were delivered into.

Messaging applications 402 executing within a hand-held computer interact with the message and folder databases 420 and 422 through the use of APIs to manipulate, store, and retrieve electronic messages in the hand-held computer. These APIs comprise a set of functional routines used by a program to direct the performance of procedures by other modules on a computer. In the embodiment disclosed herein, these APIs relate to the manipulation and storage of electronic messages on a hand-held computer.

These messaging applications 402 may comprise an electronic mail client process running on the hand-held computer to retrieve e-mail from a remote computer. These applications, through the message store system 400, manage a synchronization process used to update the contents of hand-held computer to match the data stored on a server or a desktop computer. These applications may also comprise client processes relating to voice mail messages, video image messages, and other forms of electronic messages, which are retrieved from a remote computer to be stored, manipulated, and retrieved by a user of the hand-held computer.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A computer-readable medium in a hand-held computer apparatus, the computer readable medium containing a message store configured to include a hierarchical structure of mail folders, the hierarchical structure of mail folders including a plurality of folders, the computer-readable medium having stored thereon a data structure comprising:
   a hand-held computing platform, the hand-held computing platform having a computer-readable medium, the computer readable medium storing first and second folder data structures;
   the first folder data structure containing data representing a first folder ID, the first folder ID corresponding to a first folder; and
   the second folder data structure containing data representing a second folder ID, the second folder ID corresponding to a second folder, the first folder ID being a parent of the second folder ID within the hierarchical structure of mail folders.

2. The computer readable medium of claim 1 wherein each folder data structure contains identical fields.

3. The computer readable medium of claim 1 wherein each folder is identified by a folder ID and each folder ID is a 16-bit binary value.

4. The computer-readable medium of claim 1 wherein the hierarchical structure of folders comprises:
   a default folder hierarchy, the default folder hierarchy containing at least one folder; and
   a non-default folder hierarchy, the non-default folder hierarchy containing at least one folder.

5. The computer-readable medium of claim 4 wherein the folder ID for each folder in the default hierarchy has a binary value less than or equal to 255.

6. The computer-readable medium of claim 5 wherein the hand-held computer apparatus synchronizes messages between the hand-held computer and a mail server, the hand-held computer including a flat folder structure, each folder within the flat folder structure being identified with an 8-bit folder ID, the message data structure including:
   a first data field corresponding to a folder ID;
   a second data field corresponding to flags, the flags including 8 bits corresponding to an 8-bit folder ID of the flat folder structure.

7. The computer-readable medium of claim 6 wherein:
   when the value of the mail store folder ID in the message data structure is equal to or less than 255, the value of the flag folder ID equals the mail store folder ID; and
   when the value of the mail store folder ID in the message data structure is equal to or greater than 256, the value of the flag folder ID equals the predetermined value, the predetermined value representing a predetermined simulated folder in the default folder hierarchy of the hand-held computer message store.

8. A hand-held computer apparatus including a data port for data communication with a server, the server containing an object store, the hand-held computer apparatus comprising:
   a hand-held computing platform, the hand-held computing platform having a folder module and a message module;
   the folder module creating a hierarchical structure of folders, including at least first and second folders, the first folder being a parent of the second folder, each folder having a folder data structure, each folder data structure including a folder ID field and a folder name field; and
   the message module creating a database of messages, each message having a message data structure, each message data structure having a folder ID field corresponding to data that identifies a folder in the hierarchical structure.

9. The hand-held computer apparatus of claim 8 wherein the messages are e-mail messages.

10. The hand-held computer apparatus of claim 8 wherein the folder data structure created by the folder module comprises:
    a first 16-bit field for containing a first unique folder ID, the first unique folder ID identifying a first folder; and
    a second 16-bit field for containing a second unique folder ID, the second unique folder ID identifying a second folder thereby establishing a parent/child relationship between the second folder and the first folder.

11. The hand-held computer apparatus of claim 10 wherein the folder module creates a server folder ID field in each data structure and stores a server folder ID in the server folder ID field, the server folder ID identifying a server folder corresponding to the device folder.

12. The hand-held computer apparatus of claim 11 wherein the folder module creates two or more hierarchical structures of folders including:
    a default folder hierarchy, the default folder hierarchy containing at least one folder; and
    a non-default folder hierarchy, the non-default folder hierarchy containing at least one folder.

13. The hand-held computer apparatus of claim 11, the message store on the hand-held computer including a flat folder structure and each folder within the flat folder structure being identified with an 8-bit folder ID, wherein:
    the message data structures further include a flag field corresponding to data identifying a plurality of flags, the flags including an 8-bit folder ID, the 8-bit folder ID corresponding to a folder in the flat folder structure; and the hand-held computer apparatus further comprises a synch manager synchronizing the hierarchical folder structure and the messages with the server object store.

14. The hand-held computer apparatus of claim 13 wherein:

when value of the folder ID in the message data structure is equal to or less than 255, the message module assigns a value to the flag folder ID equal to the folder ID; and when the value of the folder ID in the message data structure is equal to or greater than 256, the message module assigns a value to the flag folder ID equal to a predetermined value, the predetermined value representing a predetermined simulated folder in the hand-held computer message store.

15. The hand-held computer of claim 8, wherein the message and folder modules save messages and folder data structures, respectively, in different databases.

16. A method of operating a hand-held computer, the hand-held computer including a data port for data communications with a server, the server containing an object store, the method comprising:

providing a hand-held computer having a data port for data communications with the server and a transport module for communication between the hand-held computer and the server;

creating a hierarchical structure of folders within the hand-held computer, including at least first and second folders, the first folder being a parent of the second folder, each folder having a folder data structure, each folder data structure including a field corresponding to a folder ID and a folder name;

creating a database of folders within the hand-held computer; and creating a database of messages within the hand-held computer, each message having a message data structure, each message data structure having a field corresponding to a folder ID that identifies a folder in the hierarchical structure;

wherein messages communicated between the hand-held and the server are communicated between a folder in the hierarchical structure of folders in the hand-held computer and a corresponding folder in the server.

17. The method of claim 16 wherein creating a database of folders and creating a database of messages includes creating two separate databases.

18. The method of claim 16 wherein the messages are e-mail messages.

19. The method of claim 18 further comprising:

synchronizing the message store in the hand-held computer with the message store on a mail server;

receiving a message from the object store of the server; and associating the message with a folder wherein the folder ID in the message data structure for the message matches the folder ID in the folder data structure of the folder.

20. The method of claim 19 wherein creating a hierarchical structure of folders comprises creating two or more hierarchical folder structures, such that:

one of the hierarchical folder structures is a default folder hierarchy containing at least one folder; and one of the hierarchical folder structures is a non-default folder hierarchy containing at least one folder.

21. The method of claim 20 wherein:

the message store in the hand-held computer contains a flat folder structure and each folder within the flat folder structure is identified with an 8-bit folder ID;

the message data structure has a flag data field, the flag data field including 8 bits corresponding to an 8-bit folder ID of the flat folder structure; and the method further comprises transmitting a message from the database of messages to the object store in the server, the message data structure for the message including a folder ID.

22. The method of claim 21 further comprising:

when value of the folder ID in the message data structure is equal to or less than 255, assigning a value to the flag folder ID equal to the mail store folder ID; and when the value of the folder ID in the message data structure is equal to or greater than 256, assigning a value to the flag folder ID equal to a predetermined value, the predetermined value representing a predetermined simulated folder in the hand-held computer message store, the predetermined simulated folder used for backward compatibility purposes.

23. A computer-readable medium having computer-executable instructions for performing the method set forth in claim 22.

24. A computer data signal embodied in a carrier wave readable by a hand-held computer apparatus and encoding computer-executable instructions for performing the method set forth in claim 22.

25. A computer-readable medium having computer-executable instructions for performing the method set forth in claim 16.

26. A computer data signal embodied in a carrier wave readable by a hand-held computer apparatus and encoding computer-executable instructions for performing the method set forth in claim 16.

27. A method of operating a hand-held computer including a database and a data port for communications with a server, the database including a plurality of records that correspond to a folder data structure, the method comprising:

providing a hand-held computer having a storage medium and a database stored on the storage medium;

searching the database for an available folder ID;

creating a folder and storing the folder on the storage medium of the hand-held computer, the folder having a data structure being stored as a record in the database and including folder ID field, a parent folder ID field, and a folder name field, the available folder ID being stored in the folder ID field; and repeating searching and creating thereby creating a plurality of folders, wherein the value stored in the folder ID field for one folder equals the value stored in the parent folder ID field for another folder, thereby creating a parent/child relationship between the folders.

28. The method of claim 27 further comprising storing a predetermined value in the parent ID field for at least one of the folders, the predetermined value indicating that the folder is a root folder for a hierarchical structure of folders and does not have a parent folder.

29. The method of claim 28 wherein storing a predetermined value in the parent ID field for at least one of the folders, includes storing a predetermined value in the parent ID field for two or more of the folders, the predetermined values indicating that each of the two or more folders is a root folder for a separate hierarchical structure of folders and does not have a parent folder.

30. The method of claim 28 wherein the database is configured to store a plurality of records, each record storing a different value in the folder ID field, the values of the folder ID being sequentially assigned to folders and stored in the database, further wherein searching the database for an available folder ID comprises:

搜 searching the database for a record having a predetermined value stored in the folder ID field;

when the predetermined value is found, sequentially searching the database for a record having a next higher folder ID value; and when the search fails to find a record having the folder ID value requested by the search, assigning the requested folder ID value to the folder.

31. The method claim 30 wherein the predetermined value is 0.

32. The method of claim 30 wherein the predetermined value is 256.

33. A computer-readable medium having computer-executable instructions for performing the method set forth in claim 27.

34. A method of operating a hand-held computer, the hand-held computer including a database and a data port for communications with a server, the database including a plurality of records that correspond to a folder data structure, each folder structure including a folder ID field, a parent folder ID field, and a name field, the method comprising:

providing a hand-held computer having a storage medium and a database stored on the storage medium, the database including a plurality of records that correspond to a folder data structure, each folder structure including a folder ID field;

creating a default root folder and storing a hard-coded value in the default root folder's folder ID field;

searching the database for an available folder ID;

creating a folder and storing the available folder ID in the folder ID field; and repeating searching the database and creating a folder, thereby creating a plurality of folders, wherein the value stored in the folder ID field for one folder equals the value stored in the parent folder ID field for another folder, thereby creating a parent/child relationship between the folders.

35. The method of claim 34 further comprising:

storing a predetermined value in the parent ID field for the default root folder;

storing the predetermined value in the parent ID folder for one of the plurality of folders; and wherein the predetermined value indicates that the folders are root folders, each root folder forming a root for a hierarchical structure of folders, and each root folder does not have a parent folder.

36. The method of claim 35 further comprising creating an Inbox folder, storing a hard coded value in the Inbox folder's folder ID field, and storing a parent value in the Inbox folder's parent ID field, the parent value being equal to the value stored in the default root folder's folder ID field.

37. The method of claim 35 wherein the database further comprises a plurality of records that correspond to message data structures, each message stored in the database having a separate message data structure, each message data structure having a folder ID field, the value stored in the folder ID field providing a cross-reference to a database record corresponding to a folder database structure, the method further comprising:

creating an "Embedded" folder and storing a hard coded value in the "Embedded" folder's folder ID field and storing a parent value in the "Embedded" folder's parent ID field, the parent value being equal to the value stored in the default root folder's folder ID field; and when an e-mail message is embedded in another e-mail message, storing a value in the folder ID field for the embedded message's message data structure, the value being equal to the value stored in the "Embedded" folder's folder ID field.

38. The method of claim 35 wherein each record for a folder data structure in the database stores a different value in the folder ID field, the values of the folder ID being sequentially assigned to folders and stored in the database, further wherein searching the database for an available folder ID comprises:

searching the database for a record having a predetermined value stored in the folder ID field;

when the predetermined value is found, sequentially searching the database for a record having a next higher folder ID value; and when the search fails to find a record having the folder ID value requested by the search, assigning the requested folder ID value to the newly created folder.

39. The method of claim 35 wherein the predetermined value stored in the folder ID field is 0, the newly created folder has a value between 0 and 255 stored in the folder ID field, and the newly created folder is within the default folder hierarchy.

40. The method of claim 35 wherein the predetermined value stored in the folder ID field is 256, the newly created folder has a value greater than or equal to 256 stored in the folder ID field, and the newly created folder is within a folder hierarchy other than the default folder hierarchy.

41. A computer readable medium having computer-executable instructions for performing the method set forth in claim 34.

* * * * *